US010606832B2

United States Patent
Chung

(10) Patent No.: US 10,606,832 B2
(45) Date of Patent: Mar. 31, 2020

(54) SEARCH SYSTEM, SEARCH METHOD, AND PROGRAM

(71) Applicant: Rakuten, Inc., Tokyo (JP)

(72) Inventor: YoungJoo Chung, Setagaya-ku (JP)

(73) Assignee: RAKUTEN, INC., Tokyo (JP)

( * ) Notice: Subject to any disclaimer, the term of this patent is extended or adjusted under 35 U.S.C. 154(b) by 256 days.

(21) Appl. No.: 15/311,843

(22) PCT Filed: Feb. 27, 2015

(86) PCT No.: PCT/JP2015/055948
§ 371 (c)(1),
(2) Date: Nov. 16, 2016

(87) PCT Pub. No.: WO2016/135970
PCT Pub. Date: Sep. 1, 2016

(65) Prior Publication Data
US 2017/0083574 A1    Mar. 23, 2017

(51) Int. Cl.
*G06F 16/00*    (2019.01)
*G06F 16/2453*  (2019.01)
*G06F 16/22*    (2019.01)

(52) U.S. Cl.
CPC ........ *G06F 16/24534* (2019.01); *G06F 16/22* (2019.01)

(58) Field of Classification Search
CPC ....................................................... G06F 17/30
See application file for complete search history.

(56) References Cited

U.S. PATENT DOCUMENTS

| | | | |
|---|---|---|---|
| 8,275,666 B2 * | 9/2012 | Chang | G06Q 30/02 705/26.1 |
| 9,141,713 B1 * | 9/2015 | Narin | G06F 17/30876 |
| 9,245,271 B1 * | 1/2016 | Ahmed | G06Q 30/00 |
| 9,390,168 B1 * | 7/2016 | Dykstra | G06F 17/30752 |
| 2010/0179956 A1 * | 7/2010 | Jammalamadaka | G06F 17/30389 707/748 |

FOREIGN PATENT DOCUMENTS

| | | |
|---|---|---|
| JP | 2014-109897 A | 6/2014 |
| WO | 2012/121055 A1 | 9/2012 |

OTHER PUBLICATIONS

English Translation of International Search Report for PCT/JP2015/055948 dated May 19, 2015.
Google Inc., "Punctuation, symbol, and operator in searching—web searchhelp", [online], Google Inc., [retrieved on Feb. 19, 2015], the Internet(URL:https://support.google.com/websearch/answer/2466433).

* cited by examiner

*Primary Examiner* — Khanh B Pham
(74) *Attorney, Agent, or Firm* — HEA Law PLLC

(57) ABSTRACT

Reducing the work involved in finding a target in a case where a word having different meanings depending on context, such as differences in individuals who enters a search keyword, is entered as a search keyword. A search system obtains one of keywords entered by a user as a search condition and context information indicating context when the search condition is entered, generates a new search condition in which the one of keywords is converted in the search condition based on the one of keywords and the context information, and obtains a target that satisfies the new search condition from a plurality of objects.

9 Claims, 10 Drawing Sheets

FIG.7

| KEYWORD | PARTIAL SEARCH CONDITION | ITEM TYPE | GENDER | AGE GROUP | REGION | PREFERENCE | GIFT |
|---|---|---|---|---|---|---|---|
| CUTE | CHARACTER A, CHARACTER B | LUNCHBOX | FEMALE | LOWER GRADE ELEMENTARY SCHOOL | | | |
| CUTE | FLOWER PATTERNS, POLKA DOTS | LUNCHBOX | FEMALE | TWENTIES | | | |
| CUTE | CHILDREN, RABBIT PATTERNS | RUCKSACK | FEMALE | LOWER GRADE ELEMENTARY SCHOOL | | | |
| WARM | MOUTON, DOWN | COAT | FEMALE | | KANTO | | |
| CHEAP | STANDARD PRICE OR LESS | | | | | HIGH CLASS | NO |
| CHEAP | HALF OF STANDARD PRICE OR LESS | | | | | LOW PRICE | NO |
| CHEAP | STANDARD PRICE × 1.5 OR LESS | | | | | HIGH CLASS | YES |
| CHEAP | STANDARD PRICE × 1.3 OR LESS | | | | | LOW PRICE | YES |

FIG.8
SEARCH RESULT FOR "CUTE LUNCHBOX"
   CHARACTER A LUNCHBOX
   SHOP:AAA
   CHARACTER B LUNCHBOX
   SHOP:AAA
   CHARACTER A VERY POPULAR LUNCHBOX
   SHOP:BBB
   CHARACTER B POPULAR LUNCHBOX
   AMONG CHILDREN
   SHOP:BBB

FIG.10

| No | PURCHASE DATE | ITEM ID | SHOP ID | ITEM CATEGORY | SEARCH KEYWORD | ITEM TYPE | GENDER | AGE GROUP | PREFERENCE | REGION | GIFT |
|---|---|---|---|---|---|---|---|---|---|---|---|
| 1 | FEB. 8, 2015 10:01 | P2011 | S001 | CHARACTER LUNCHBOX | CUTE LUNCHBOX | LUNCH BOX | FEMALE | LOWER GRADE ELEMENTARY SCHOOL | LOW PRICE | KANTO | NO |
| 2 | FEB. 8, 2015 11:03 | P2011 | S001 | CHARACTER LUNCHBOX | CHARACTER A LUNCHBOX | LUNCH BOX | FEMALE | LOWER GRADE ELEMENTARY SCHOOL | LOW PRICE | KANTO | NO |
| 3 | FEB. 8, 2015 19:06 | P2041 | S003 | LUNCHBOX FOR WOMEN | CUTE LUNCHBOX | LUNCH BOX | FEMALE | TWENTIES | HIGH CLASS | KYUSHU | NO |
| 4 | FEB. 8, 2015 19:27 | P2041 | S003 | LUNCHBOX FOR WOMEN | FLOWER-PATTERN LUNCHBOX | LUNCH BOX | FEMALE | TWENTIES | HIGH CLASS | KYUSHU | NO |
| 5 | FEB. 10, 2015 16:30 | P1001 | S110 | LUNCHBOX FOR WOMEN | WARM COAT | COAT | FEMALE | THIRTIES | HIGH CLASS | KANTO | NO |
| 6 | FEB. 10, 2015 21:15 | P1001 | S110 | COAT FOR WOMEN | MOUTON COAT | COAT | FEMALE | THIRTIES | HIGH CLASS | KANTO | NO |
| 7 | FEB. 10, 2015 21:15 | P1001 | S110 | COAT FOR WOMEN | DOWN COAT | COAT | FEMALE | THIRTIES | HIGH CLASS | KANTO | NO |
| 8 | FEB. 10, 2015 22:02 | P3020 | S202 | BAG FOR KIDS | CUTE RUCKSACK | RUCKSACK | FEMALE | THIRTIES | HIGH CLASS | KANTO | NO |
| 9 | FEB. 10, 2015 22:20 | P3020 | S202 | BAG FOR KIDS | RABBIT-PATTERN RUCKSACK | RUCKSACK | FEMALE | THIRTIES | HIGH CLASS | KANTO | NO |

SEARCH SYSTEM, SEARCH METHOD, AND PROGRAM

CROSS REFERENCE TO RELATED APPLICATIONS

This application is a National Stage of International Application No. PCT/JP2015/055948 filed on Feb. 27, 2015. The contents of the above document is incorporated herein by reference in its entirety.

TECHNICAL FIELD

The present invention relates to a search system, a search method, and a program.

BACKGROUND ART

It has been common practice to search data, for example, to search items by an e-commerce system. In order to execute a search, there is a system for obtaining a search keyword and searching a target in some objects based on the keyword.

Non-patent Literature 1 discloses that, for example, a search system searches Web pages where cameras in the price range from $50 to $100 are posted using a search keyword "camera $50 . . . $100."

CITATION LIST

Non-Patent Document

Non-patent Literature 1: Google Inc., "Punctuation, symbol, and operator in searching-web search help", [online], Google Inc., [retrieved on Feb. 19, 2015], the Internet (URL:https://support.google.com/websearch/answer/2466433)

SUMMARY OF INVENTION

Technical Problem

Sometimes a word having meaning that varies depending on context is entered as a search keyword, such as a word "cute", which may be different in assumed meaning depending on individuals. In a case where such word is used for search, more effort to find a target is required because it finds a variety of objects corresponding to the word that is used in various contexts such as "adult" and "infant".

One or more embodiments of the present invention have been conceived in view of the above, and an object thereof is to provide technology for reducing the work involved in finding a target from searched objects in a case where a word having different meanings depending on context, such as differences in individuals who enters a search keyword, is entered as a search keyword.

Solution to Problem

In order to solve the above described problems, a search system according to the present invention includes obtaining means for obtaining one of keywords entered by a user as a search condition and context information indicating context when the search condition is entered, converting means for generating a new search condition in which the one of keywords is converted in the search condition based on the one of keywords and the context information, and searching means for obtaining a target that satisfies the new search condition from a plurality of objects.

A search method according to the present invention includes the steps of obtaining one of keywords entered by a user as a search condition and context information indicating context when the search condition is entered, generating a new search condition in which the one of keywords is converted in the search condition based on the one of keywords and the context information, and obtaining a target that satisfies the new search condition from a plurality of objects.

A program according to the present invention for causing a computer to function as obtaining means for obtaining one of keywords entered by a user as a search condition and context information indicating context when the search condition is entered, converting means for generating a new search condition in which the one of keywords is converted in the search condition based on the one of keywords and the context information, and searching means for obtaining a target that satisfies the new search condition from a plurality of objects.

According to the present invention, for example, it is possible to reduce the work involved in finding a target from searched objects in a case where a word having different meanings depending on context, such as differences in individuals who enters a search keyword, is entered as a search keyword.

In an embodiment of the present invention, the context information may be at least one of information indicating an attribute of the user, another keyword entered as the search condition and indicating a type of the target, a time when the search condition is entered, a place where the search condition is entered, and a situation of the user when the search condition is entered.

In an embodiment of the present invention, the converting means may convert the one of keywords into another condition based on the one of keywords and the context information, and generate a new search condition including a condition, which excludes the one of keywords from the search condition, and the converted another condition.

In an embodiment of the present invention, the converting means may obtain, from the conversion information storing means that stores a keyword, context information, and a search condition in association with one another, a search condition corresponding to the obtained keyword and the obtained context information, as the another condition in which the obtained keyword is converted.

A search system according to the present invention includes related keyword obtaining means for obtaining a second keyword relating to a first keyword based on a first operation that is performed by one or more users and associates a target with the first keyword, context of the first operation, and one or more second operations that associate the target with a keyword in the context, and conversion information setting means for storing the obtained second keyword in association with the first keyword and the context into conversion information storing means as a converted search condition.

A search method according to the present invention includes the steps of obtaining a second keyword relating to a first keyword based on a first operation that is performed by one or more users and associates a target with the first keyword, context of the first operation, and one or more second operations that associate the target with a keyword in the context, and storing the obtained second keyword in association with the first keyword and the context into conversion information storing means as a converted search condition.

A program according to the present invention causes a computer to function as related keyword obtaining means for obtaining a second keyword relating to a first keyword based on a first operation that is performed by one or more users and associates a target with the first keyword, context of the first operation, and one or more second operations that associate the target with a keyword in the context, and conversion information setting means for storing the obtained second keyword in association with the first keyword and the context into conversion information storing means as a converted search condition.

According to the present invention, for example, it is possible to reduce the work involved in finding a target from searched objects in a case where a word having different meanings depending on context, such as differences in individuals who enters a search keyword, is entered as a search keyword.

In an embodiment of the present invention, the related keyword obtaining means may obtain information indicating the first operation performed by the one or more users to associate the target with the first keyword and the context information indicating context of the operation, and obtains another second keyword, which is associated with the target obtained in the context or a target similar to the obtained target by the second operation.

In an embodiment of the present invention, the related keyword obtaining means may obtain one or more targets, which are the targets obtained by a search according to the first keyword and receive a predetermined instruction from the user, and context of the search, and obtains another keyword in another search, which is a search where the target obtained in the context or the target similar to the obtained target is obtained, as the second keyword.

In an embodiment of the present invention, the related condition generating unit may obtain one or more targets to which the user enters an evaluation comment including the first keyword and the context information indicating context to which the evaluation comment is entered, and obtains another keyword, as the second keyword, in the search where the target obtained in the context or the target similar to the obtained target is obtained.

BRIEF DESCRIPTION OF DRAWINGS

FIG. 7 is a diagram illustrating an example of conversion information stored in a conversion information storing unit;

FIG. 8 is a diagram illustrating an example of an item list screen;

FIG. 10 is a diagram illustrating an example of purchase log information stored in a purchase log storing unit.

DESCRIPTION OF EMBODIMENTS

Figure 1:
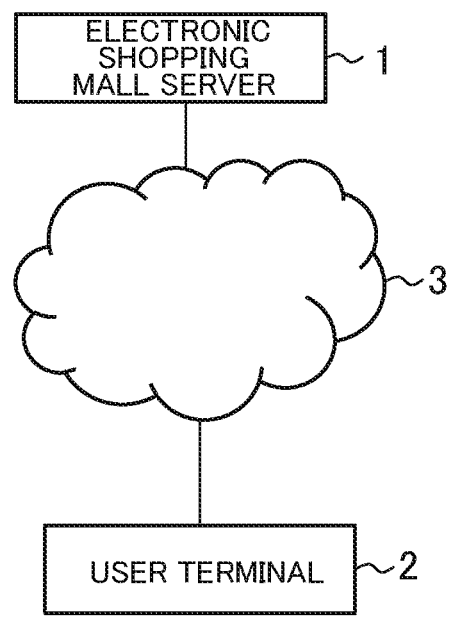
FIG. 1 is a diagram illustrating an example of an e-commerce system according to an embodiment of the present invention.

An embodiment of the present invention will be described below with reference to the accompanying drawings. Regarding the elements designated with the same reference numerals, their overlapping explanation will be omitted. This embodiment will explain an e-commerce system for searching items as a search system. In the following, targets of the search are products or services, although other kinds of targets may be targets of the search. Further, in the following description, the word "context" indicates information (e.g., background and situation) relating to a certain matter and usable for understanding and assuming the matter. The word "context" also includes various types of information other than texts and words.

FIG. 1 is a diagram illustrating an example of an e-commerce system according to the embodiment of the present invention. The e-commerce system includes an electronic shopping mall server 1 and a user terminal 2. These are connected to one another via a network 3. The network 3 is, for example, a local area network or the Internet.

The electronic shopping mall server 1 is a server computer. The electronic shopping mall server 1 executes a web server program (e.g., httpd), receives information from the user terminal 2, which executes a browser program, through the Internet, and outputs, for example, information for displaying an image (screen) including a button or a character string on the user terminal 2.

The user terminal 2 is, for example, a personal computer or a smartphone. The user terminal 2 sends information entered by a user to the electronic shopping mall server 1 etc., receives information from the electronic shopping mall server 1 etc., and controls a display output device to display an image according to the information.

Figure 2:
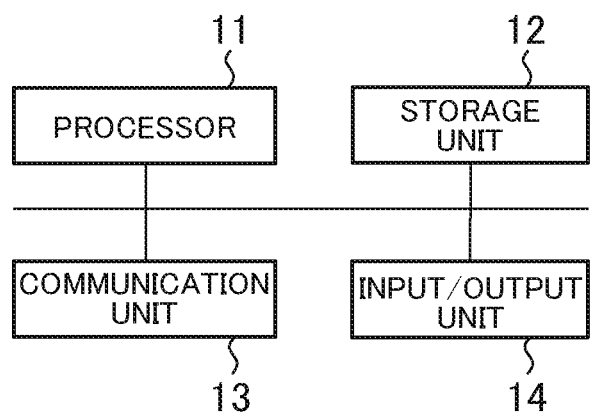
FIG. 2 is a diagram illustrating a hardware configuration of an e-commerce server.

FIG. 2 is a diagram illustrating an example of a hardware configuration of the electronic shopping mall server 1. The electronic shopping mall server 1 and the user terminal 2 each include a processor 11, a storage unit 12, a communication unit 13, and an input/output unit 14.

The processor 11 operates in accordance with a program stored in the storage unit 12. The processor 11 controls the communication unit 13 and the input/output unit 14. In this regard, the program may be provided through the Internet, for example, or by being stored in a computer-readable storage medium such as a flash memory or a DVD-ROM.

The storage unit 12 includes a memory device, such as a RAM or a flash memory, and a hard disk drive. The storage unit 12 stores the program. The storage unit 12 also stores information and computational results from each unit.

The communication unit 13 implements functions to communicate with other devices, and includes an integrated circuit of a wired LAN, for example. The communication unit 13 inputs information received from other devices into the processor 11 and the storage unit 12, and sends information to other devices under the control of the processor 11.

The input/output unit 14 includes a video controller for controlling the display output device, and a controller for obtaining data from an input device. The input device is, for example, a keyboard, a mouse, and a touch panel. The input/output unit 14 outputs display data to the display output device under the control of the processor 11, and obtains data that is entered when the user operates the input device. The display output device is, for example, a display device connected to the outside.

Similarly to the electronic shopping mall server 1, the user terminal 2 includes a processor 11, a storage unit 12, a communication unit 13, and an input/output unit 14, for example. The user terminal 2 provides functions to present a screen based on the data received from the electronic shopping mall server 1, for example, and to send information entered by the user regarding the screen to the electronic shopping mall server 1, for example. These functions are implemented, for example, when the processor 11 included in the user terminal 2 executes a program such as a browser, and performs processing according to the data received from the electronic shopping mall server 1 etc. These functions may be implemented not only by a browser, but also by a dedicated application program.

Figure 3:
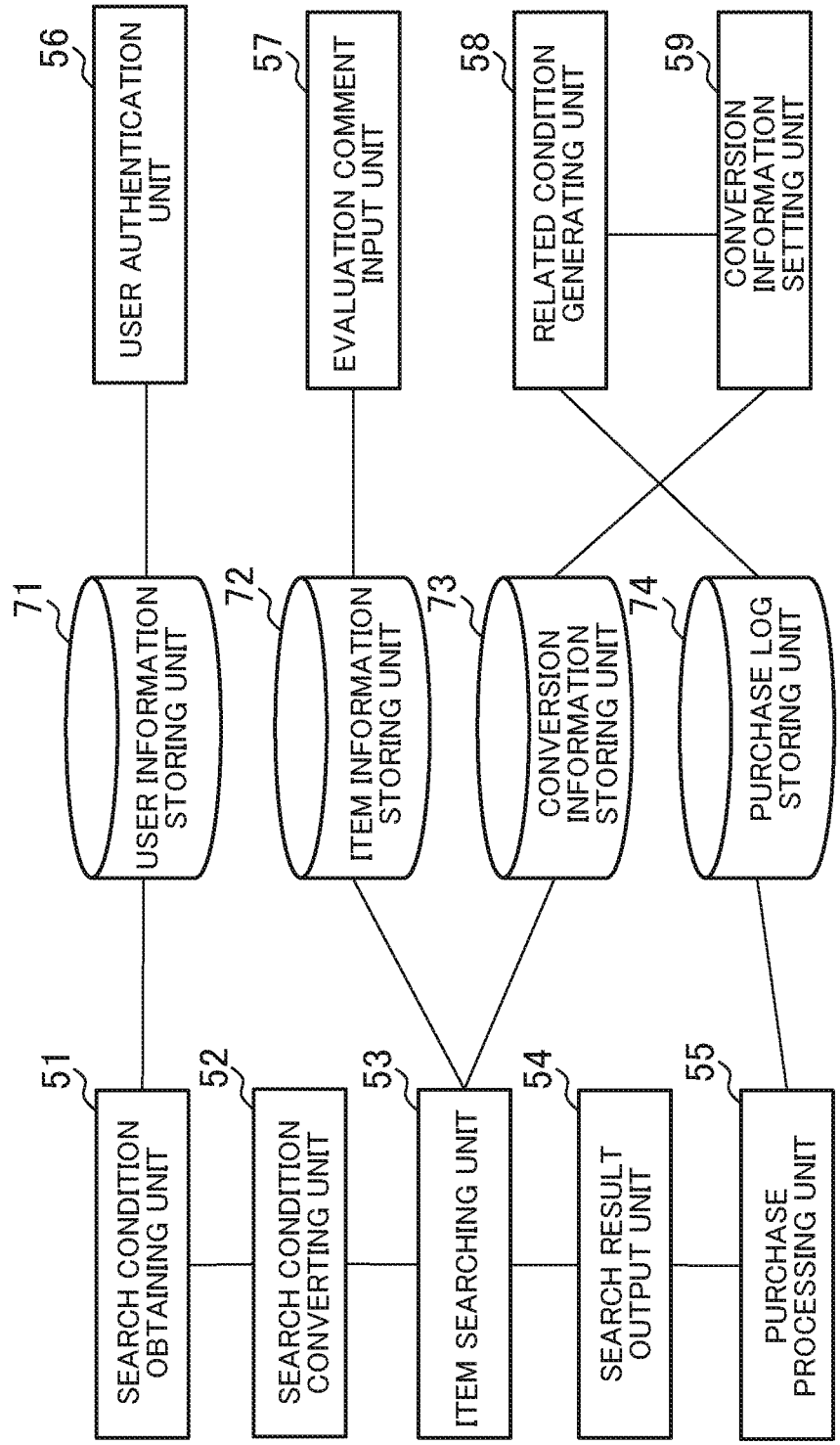
FIG. 3 is a block diagram illustrating functions implemented by the e-commerce server.

Next, functions and processing provided by the electronic shopping mall server 1 according to the embodiment of the present invention will be discussed. FIG. 3 is a block diagram indicating functions implemented by the electronic shopping mall server 1. The electronic shopping mall server 1 functionally includes a search condition obtaining unit 51, a search condition converting unit 52, an item searching unit 53, a search result output unit 54, a purchase processing unit 55, a user authentication unit 56, an evaluation comment input unit 57, a related condition generating unit 58, a conversion information setting unit 59, a user information storing unit 71, an item information storing unit 72, a conversion information storing unit 73, a purchase log storing unit 74. These functions are implemented when the processor 11 included in the electronic shopping mall server 1 executes a program stored in the storage unit 12 and controls the communication unit 13, for example.

The user information storing unit 71 is mainly implemented by the storage unit 12. The user information storing unit 71 stores information about user ID, age, gender, residence, preference, and other attributes of each of users. The item information storing unit 72 stores information indicating attributes of an item, such as item ID, item name, item category, and price, for each of items. Further, the item information storing unit 72 may also store information such as an item ID, name, category, and price of services in addition to items. In the following, it should be appreciated that the descriptions regarding "item" may also be applied to "service."

The conversion information storing unit 73 is mainly implemented by the storage unit 12. The conversion information storing unit 73 stores conversion information corresponding to a keyword for a combination of context information and the keyword. The purchase log storing unit 74 stores purchase log information that is generated each time an item is purchased. The details of context information, conversion information, and purchase log information will be described later.

The user authentication unit 56 is mainly implemented by the processor 11, the storage unit 12, and the communication unit 13. The user authentication unit 56 obtains authentication information, such as an ID and a password entered by a user, from the user terminal 2, and authenticates the user. Further, the user authentication unit 56 associates a session, to which an access from the user's user terminal 2 belongs, with the user based on session information. The user authentication unit 56 sends the session information to the user terminal 2, and when the user performs any operation on a screen sent from the functions of the electronic shopping mall server 1, the user terminal 2 sends the session information together with information indicating such operation.

The evaluation comment input unit 57 receives an evaluation comment (text of review) of an item entered by a user who has purchased the item, and stores, in the item information storing unit 72, the text of the review and information of the user who has entered the text in association with the item.

Figure 4:
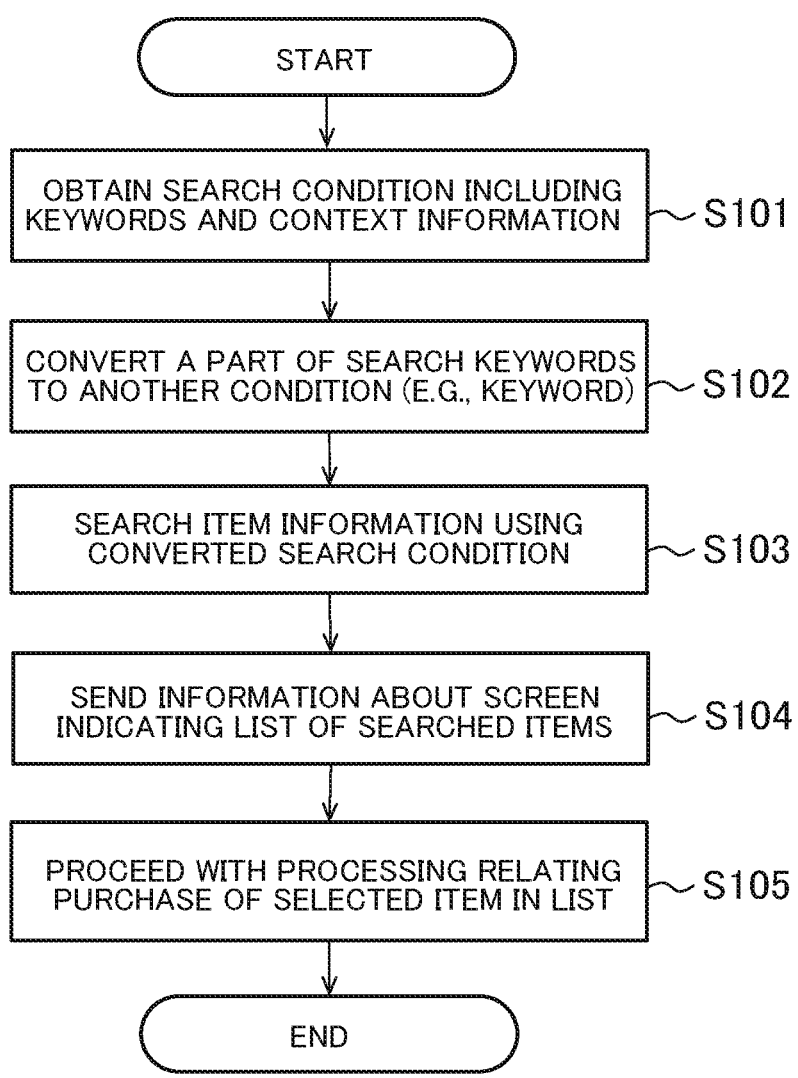
FIG. 4 is a processing flow chart showing an overview of processing from searching to purchasing an item.

Next, the functions provided by the electronic shopping mall server 1 and relating to searching and purchasing items will be discussed. FIG. 4 is a processing flow chart showing an overview of processing from searching to purchasing an item. In the following, functions of the search condition obtaining unit 51, the search condition converting unit 52, the item searching unit 53, the search result output unit 54, the purchase processing unit 55 will be discussed with the processing flow chart.

The search condition obtaining unit 51 is mainly implemented by the processor 11, the storage unit 12, and the communication unit 13. The search condition obtaining unit 51 obtains one of keywords (also referred to as "search keywords") entered by a user as a search condition and context information indicating the context when the search condition is entered (step S101). The context information is information about at least one of the following: an attribute of a person who has entered the search condition, time when the search condition is entered, a type of a search target, a search method, a purpose of search, a place where the search condition is entered, a situation of the person who has entered the search condition (e.g., in motion or not). The context information is information about at least one of, for example, an attribute of a user who enters a search condition, date and time when the condition is entered, other keywords entered as the search condition, and whether the searched item is for a gift.

Figure 5:
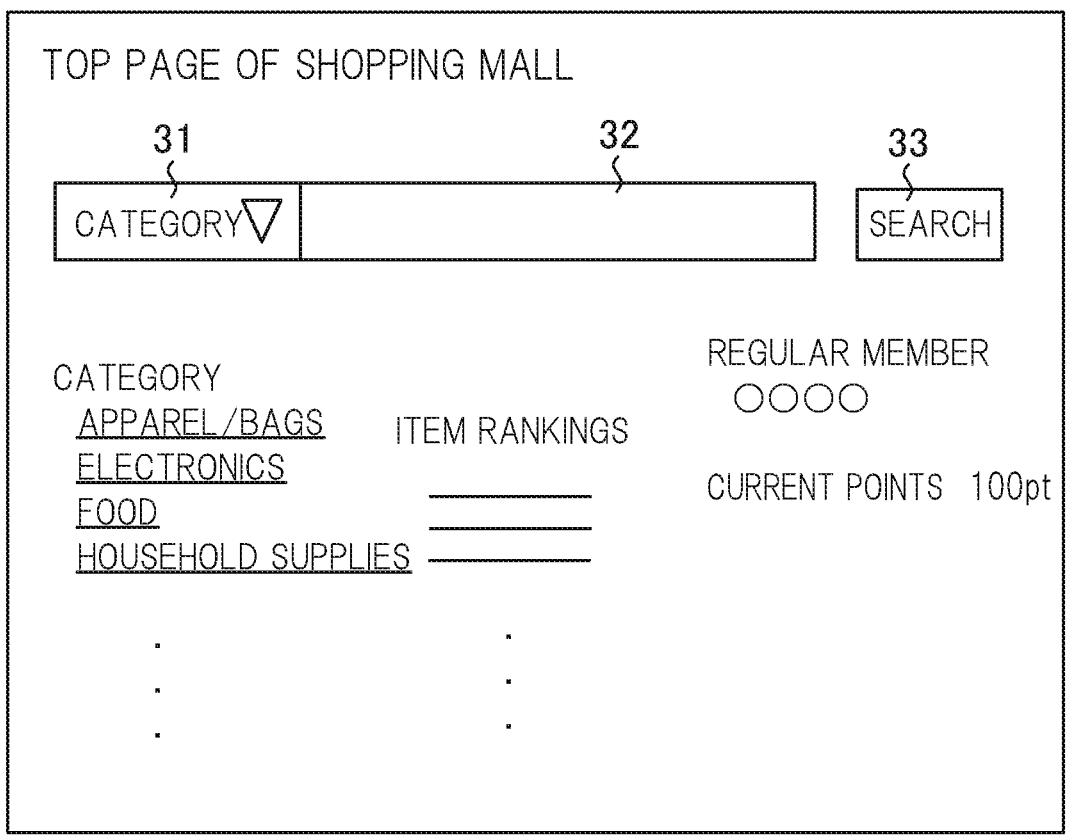
FIG. 5 is a diagram illustrating an example of a search condition input screen.

FIG. 5 is a diagram illustrating an example of a search condition input screen. The search condition input screen is a screen for a user to enter a search condition. Before obtaining the search condition, the search condition obtaining unit 51 generates information about the screen, and sends the generated information to the user terminal 2. The search condition input screen has a field 31 to enter a category of an item, a field 32 to enter a search keyword, and a search button 33 arranged therein. When the user presses the search button 33, the user terminal 2 sends session information indicating the logged-in user, the category of the item as the search condition, and the search keyword. The search condition obtaining unit 51 receives the transmitted session information and search condition. Further, the search condition obtaining unit 51 identifies a user who has sent the search condition based on the received session information, for example, and obtains information about the user's attribute from the user information storing unit 71 as the context information. In this regard, the user terminal 2 may send information about, for example, whether an item is for a gift or not, as a search condition, and the search condition obtaining unit 51 may receive such information as context information.

The search condition obtaining unit 51 may obtain context information based on behavior history of the user. For example, the search condition obtaining unit 51 may obtain an average purchase amount at a time by aggregating information of item purchase history including the purchase amount and types of items that the user has purchased. When the average purchase amount is greater than a threshold value, a preference may be obtained as "high class", and when the average purchase amount is smaller than the threshold value, a preference may be obtained as "low price." The electronic shopping mall server 1 may determine the user's attribute, such as preference, based on the item purchase history, for example, and store the user's attribute determined in advance in the user information storing unit 71. The search condition obtaining unit 51 may estimate an age group or gender of a person who uses an item to be purchased by the user based on gender or an age group that frequently purchases the item included in the user's item purchase history. When the age group or the gender can be estimated, the search condition obtaining unit 51 may obtain the estimated age group or gender as context information instead of the age group or the gender registered by the user.

The search condition converting unit 52 is mainly implemented by the processor 11 and the storage unit 12. The search condition converting unit 52 generates, based on one of the search keywords obtained by the search condition obtaining unit 51 and the context information, a new search condition in which one of the search keywords is converted to another condition (e.g., keyword) (step S102). More specifically, the search condition converting unit 52 converts apart of the search keywords to another condition based on the part of the search keywords and the context information, and generates a new search condition including conditions other than the keyword before conversion among the search conditions and the other condition generated by the search condition converting unit 52.

The item searching unit 53 is mainly implemented by the processor 11 and the storage unit 12. The item searching unit 53 obtains an item, which is a result of the searching the items stored in the item information storing unit 72, based on the converted search condition (step S103). More specifically, the item searching unit 53 obtains information about the item that satisfies the new search condition among from information about the items stored in the item information storing unit 72.

Figure 6:
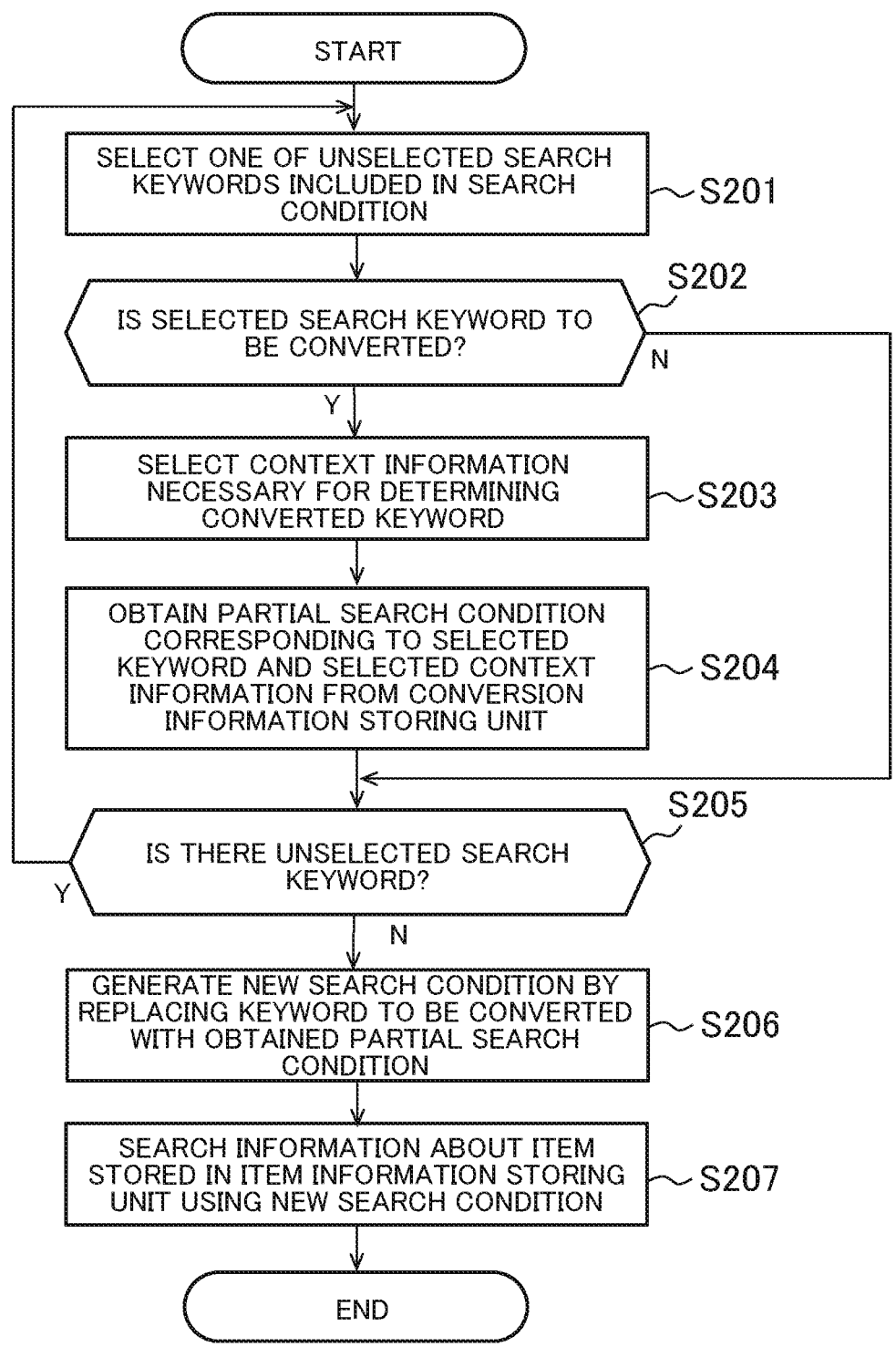
FIG. 6 is a processing flow chart showing an example of processing mainly of a search condition converting unit and an item searching unit.

The processing of the search condition converting unit 52 and the item searching unit 53 will be discussed in further detail. FIG. 6 is a processing flow chart indicating an example of the processing of the search condition converting unit 52 and the item searching unit 53.

First, the search condition converting unit 52 selects one of one or more unselected search keywords included in the obtained search condition (step S201). In a case where the step S201 is executed for the first time, assume that all of the keywords included in the search condition are unselected, and the keyword once selected in step S201 is not selected in the following processing in step S201. Subsequently, the search condition converting unit 52 determines whether the selected search keyword is a keyword to be converted (step S202). The search condition converting unit 52 may perform the determination based on whether the conversion information associated with a keyword, which is the same as the selected search keyword, is stored in the conversion information storing unit 73, or perform the determination by generating a list of keywords to be converted in advance and determining whether the list includes the selected search keyword.

When the selected search keyword is not a keyword to be converted (N in step S202), the processing from step S203 to step S205 below is not performed. On the other hand, the selected search keyword is a keyword to be converted (Y in step S202), the search condition converting unit 52 selects context information necessary for determining a partial search condition of the converted keyword (step S203).

FIG. 7 is a diagram illustrating some examples of the conversion information stored in the conversion information storing unit 73. In FIG. 7, each of the examples of the conversion information includes a keyword, a partial search condition, an item type, a gender, an age group, a region, a preference, and a flag indicating whether the item is for a gift. The item type, gender, age group, region, preference, flag of whether the item is for a gift are included in the context information. The gender, age group, region, and preference are information relating to the user's attribute, and the item type and the flag indicating whether the item is for a gift are included in information relating to search targets. The partial search condition is a search condition partially converted based on the search keyword (also referred to as "converted search condition" in the following). The context information and the keyword included in the conversion information are associated with the converted search condition. In this regard, the context information may include information about seasons and time of day, and information about types of user terminal 2 (e.g., PC and smartphone) used by users to enter search conditions.

For example, in FIG. 7, the conversion information storing unit 73 stores conversion information including a keyword "cute." In a case where two keywords "cute" and "lunchbox" are obtained as search keywords, the search condition converting unit 52 determines the keyword "cute" to be a conversion target in step S202.

In step S203, the search condition converting unit 52 selects context information pieces (e.g., item type, gender, age group) having values, as the context information pieces for determining converted keyword, among from the context information included in conversion information having a keyword to be converted (e.g., "cute"). The search condition converting unit 52 then obtains information about the selected pieces among from the context information obtained by the search condition obtaining unit 51. The search condition converting unit 52 obtains, for example, a user's attributes, such as gender and age group, which are stored in the user information storing unit 71 with respect to the user who enters the search condition, and obtains an item type from the category information entered as the search condition. The search condition converting unit 52 determines whether one or more item types (e.g., "lunchbox", "rucksack") included in the conversion information including the keyword to be converted are identical or similar to other search keywords (e.g., "lunchbox"). If there is a keyword determined to be identical or similar to one of the item types, the search condition converting unit 52 may obtain such item type (e.g., "lunchbox") as context information.

When the context information is selected, the search condition converting unit 52 obtains partial search condition, from the conversion information associated with the selected keyword and the selected context information, as a part of a new search condition that is different from the original search condition and is the converted condition (step S204).

The partial search condition may be one or more keywords that are different from the selected keyword. In this case, a logical OR of multiple keywords is a partial search condition. For example, in FIG. 7, when the selected context information includes a gender "female", an age group "lower grade of elementary school", and an item type "lunchbox" regarding the keyword "cute", two keywords "character A" and "character B" are selected as a partial search condition. The partial search condition has either of the keywords "character A" and "character B." For example, the "character A" and the "character B" are characters of games and animations that are popular among elementary school students. Even though the keyword is "cute", when a gender is "female", an age group is "twenties", and an item type is "lunchbox", two keywords "flower patterns" and "polka dots" are selected as a partial search condition.

The partial search condition may be a condition relating to numerical values, such as a price range of an item. For example, when the search keyword is "cheap" or "high class", a range of prices based on a standard price defined for each item type may be obtained as a partial search condition. A standard price defined for each item type may be stored in the item information storing unit 72.

When there is an unselected keyword (Y in step S205), the processing repeats from step S201. On the other hand, when there is no unselected keyword (N in step S205), the search condition converting unit 52 generates a new search condition by replacing a keyword to be converted, which has been processed, with the partial search condition obtained for the keyword to be converted (step S206). The new search condition includes the obtained partial search condition and the search condition without including the keywords to be converted.

Subsequently, the item searching unit 53 searches information about items stored in the item information storing unit 72 using the new search condition (step S207).

The search result output unit 54 is mainly implemented by the processor 11, the storage unit 12, and the communication unit 13. The search result output unit 54 sends information indicating items searched by the item searching unit 53. More specifically, the search result output unit 54 generates information about an item list screen indicating a list of searched items, and sends the generated information to the user terminal 2 (step S104).

FIG. 8 is a diagram illustrating an example of the item list screen. The search result output unit 54 generates information about the item list screen in which one or more items searched by the item searching unit 53 are displayed in a list.

In a case where the search condition converting unit 52 converts a search keyword (e.g., "cute") into a logical OR ("character A" OR "character B") of some keywords, the search result output unit 54 may generate information about an item list screen including a list of items grouped for each keyword constituting the converted logical OR. In this way, different from the example of FIG. 8, lunchboxes regarding "character A" are listed up, and also lunchboxes regarding "character B" are listed up. This allows a user to more easily find an item from the list.

The purchase processing unit 55 is mainly implemented by the processor 11, the storage unit 12, and the communication unit 13. The purchase processing unit 55 receives, from the user terminal 2, information about an item selected by the user from the multiple items displayed on the item list screen, and proceeds with the processing for purchasing the item (step S105). More specifically, the purchase processing unit 55 generates information about an item detailed screen indicating details of the selected item, and sends the generated information to the user terminal 2. The purchase processing unit 55 obtains information about the user's indicating of purchase, from the user terminal 2, and proceeds with the processing relating the purchase, such as obtaining information about settlement and shipping.

Figure 9:
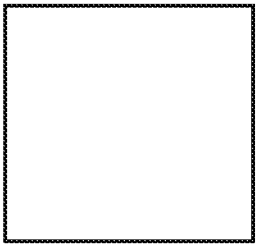
FIG. 9 is a diagram illustrating an example of an item detailed screen.

FIG. 9 is a diagram illustrating an example of the item detailed screen. The item detailed screen displays, for example, a price and an image of an item, evaluation comments, "Add to cart" button for a user to press to indicate the user's intent to purchase, "Add to wish list" button for a user to press to refer to the item later as a candidate for purchase, and reviews of other users on the item displayed on the item detailed screen, which are stored in the item information storing unit 72. Upon receiving the information indicating that the "Add to cart" button is pressed on the user terminal 2, the purchase processing unit 55 executes the processing for the user to input methods of payment and delivery, and the processing for requesting a shop selling the item to ship the item.

The purchase processing unit 55 stores new purchase log information in the purchase log storing unit 74 when the user performs an operation indicative of an intent to purchase the item in the processing relating to purchase. FIG. 10 is a diagram illustrating an example of purchase log information stored in the purchase log storing unit 74.

The purchase log information includes a purchase date, an item ID for specifying the item, a shop ID of the shop selling the item, an item category to which the item belongs, a search keyword used for searching the item, and context information at the time the search is performed. The item categories are classified in a tree form of plural hierarchies. In the example of FIG. 10, only the category in the lowest level is shown. The pieces of the context information are the same as the pieces of the context information included in the conversion information. In the example of FIG. 10, the pieces include item type, gender, age group, user's preference, user's residential area, flag indicating whether the item is for a gift. The purchase processing unit 55 may store, in item types, item categories in a specific level (e.g., second level from the bottom) to which the purchased item belong, or set, in the purchase log information, the item types previously stored in the item information storing unit 72 in association with items. The purchase processing unit 55 may set the attributes entered by the user in advance and stored in the user information storing unit 71, or set the attributes estimated by the past purchase log etc. of the user, as the user's attributes (e.g., gender, age group, preference, residence) included in the purchase log information. The detail of the estimation is the same as what is explained about the search condition obtaining unit 51.

Next, a method for generating conversion information will be discussed. The related condition generating unit 58 is mainly implemented by the processor 11 and the storage unit 12. The related condition generating unit 58 obtains a second keyword (corresponding to a partial search condition), which relates to a first keyword entered as a search condition. The related condition generating unit 58 obtains the second keyword based on a first operation related to the first keyword and performed by one or more users, information indicating context of the first operation, and one or more second operations related to the second keyword for the context. The first operation is an operation performed by one or more users to associate a target (e.g., item) with the first keyword, and the second operation is an operation performed by one or more users to associate the target with a keyword that is different from the first keyword. More specifically, for example, the first operation is to search using a first keyword, and to purchase a target obtained as a result of the search. In this case, the purchased target is associated with the first keyword and the context information. Further, for example, the second operation is to search using a second keyword, and to purchase a target obtained as a result of the search. In this case, similarly, the purchased target is associated with the second keyword and the context information. The related condition generating unit 58 may obtain a partial condition according to the context related to a price in response to a word such as "cheap" by statistically analyzing purchase log.

The first operation may be a predetermined instruction (e.g., purchasing or selecting an item from an item list) by the user regarding the target obtained by the search according to the first keyword, or the user's input of evaluation comments including the first keyword about the target. The second operation may be a predetermined instruction by the user regarding the target obtained by the search according to the second keyword. In other words, the related condition generating unit 58 obtains the context of the search and one or more targets to which the predetermined instruction is made. Then, when a predetermined instruction is made to the target or a target similar to the target in the context, the related condition generating unit 58 may obtain a keyword, which is a search condition for obtaining the target or the similar target and which is different from the first keyword, as a second keyword. More specifically, for example, when an item is purchased resulting from the search by the first keyword in the context, and then, the item or the similar item is purchased resulting from the search by another keyword in the same context, the related condition generating unit 58 obtains another keyword in the later search as a second keyword.

The related condition generating unit 58 may obtain one or more targets, regarding which the user enters evaluation comments including the first keyword, and context information indicating the context in which the evaluation comments have been entered. In a case where the second operation is made to the target or the similar target in the context, the related condition generating unit 58 may obtain a keyword, which is a search condition for obtaining the obtained target or the target similar to the obtained target and is different from the first keyword, as a second keyword. More specifically, for example, when a first keyword is entered in a context as a review of an item, and then, the item or an item similar to the item is purchased resulting from the search by another keyword in the context, the related condition generating unit 58 obtains another keyword in the later search as a second keyword.

The conversion information setting unit 59 is mainly implemented by the processor 11 and the storage unit 12. The conversion information setting unit 59 stores the second keyword obtained by the related condition generating unit 58, as the converted partial search condition, into the conversion information storing unit 73 in association with the first keyword and the context information.

Figure 11:
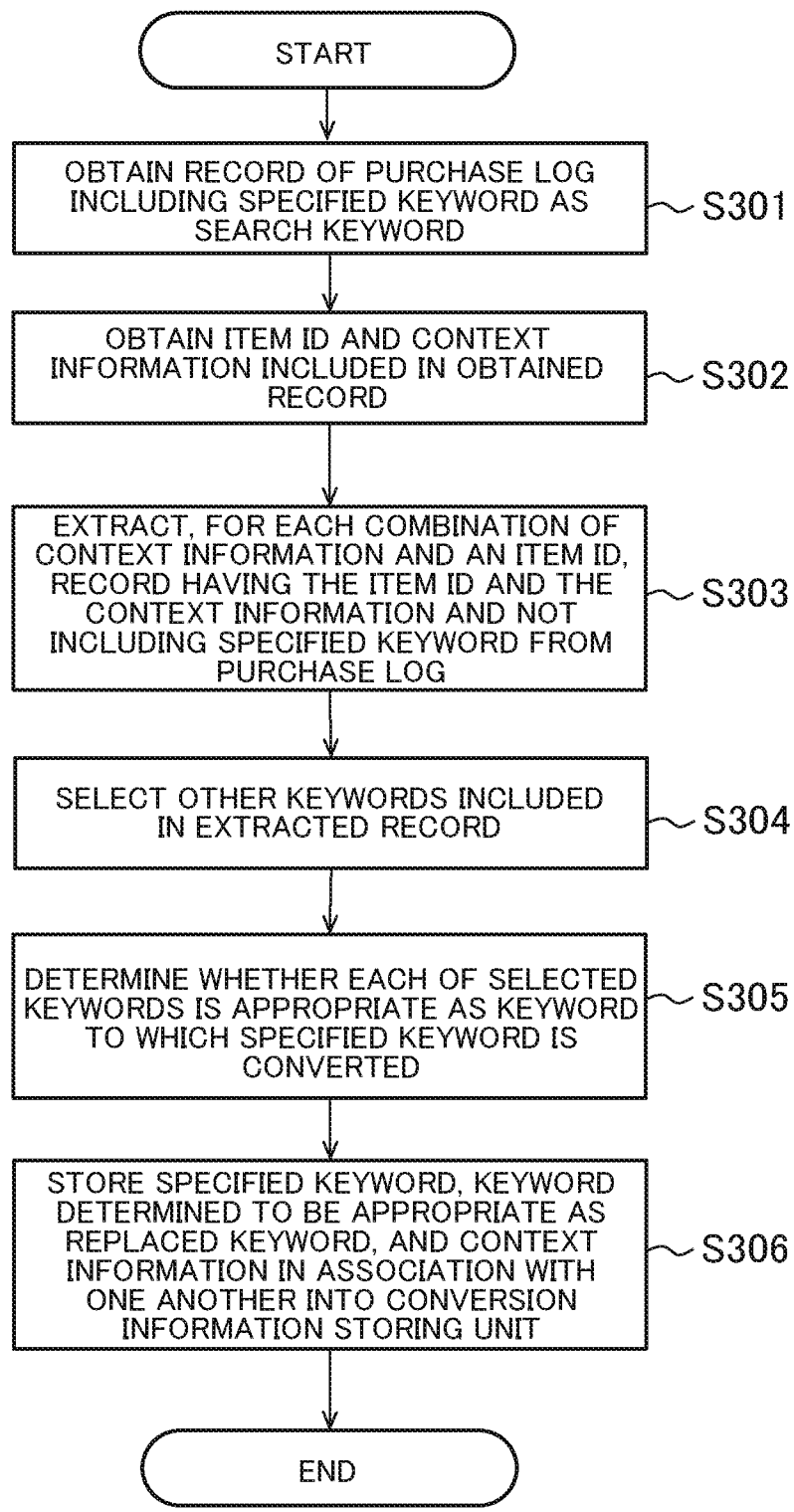
FIG. 11 is a flow chart showing an example of processing for generating conversion information by a related condition generating unit and a conversion information setting unit.

Next, the processing for generating conversion information including a second keyword that corresponds to a first keyword will be discussed in detail with the drawing. FIG. 11 is a flow chart showing an example of the processing for generating conversion information by the related condition generating unit 58 and the conversion information setting unit 59. The processing of the related condition generating unit 58 and the conversion information setting unit 59 is activated weekly or monthly, for example. The processing shown in FIG. 11 is executed for each of first keywords specified in advance. In the following, a first keyword to be a target of the processing shown in FIG. 11 is described as a "specified keyword."

First, the related condition generating unit 58 obtains records of the purchase log including the specified keyword as a search keyword (step S301). In the example of FIG. 10, when the specified keyword is "cute", the related condition generating unit 58 obtains the records with the numbers 1, 3, and 8, and when the specified keyword is "warm", obtains the records with the number 5.

Subsequently, the related condition generating unit 58 obtains item IDs and context information included in the obtained records (step S302). There may be a plurality of types of combinations of the obtained item IDs and the context information. The related condition generating unit 58 may obtain the lowest level category of the item instead of an item ID. In the subsequent processing, the related condition generating unit 58 may use the lowest level category instead of the item ID. Further, the related condition generating unit 58 obtains some pieces of the context information stored in the purchase log as context information used in step S303 and subsequent steps. More specifically, the storage unit 12 stores, in advance, pieces of the context information used for the first keyword, and the related condition generating unit 58 obtains only the pieces of the context information, which correspond to the specified keyword, among the context information stored in the purchase log information. For example, when the specified keyword is "cute", the related condition generating unit 58 obtains only an item type, a gender, and an age group as context information. When the specified keyword is "warm", the related condition generating unit 58 obtains a gender and a region as context information. It has been determined experimentally that information pieces for useful in finding a second keyword differ depending on keywords, and thus, this enables to enhance accuracy of conversion of keywords.

In steps S301 and S302, item IDs and context information are obtained from the purchase log, although the related condition generating unit 58 may obtain evaluation comments, which are review comments of an item stored in the item information storing unit 72 by the evaluation comment input unit 57 and which include the specified keyword, an attribute of a user who inputs the evaluation comments, and an item ID. The user's attribute obtained here corresponds to context information.

Subsequently, for each combination of context information and an item ID, the related condition generating unit 58 extracts a record that has the item ID and the context information and that does not include the specified keyword from the purchase log (step S303). In the example of FIG. 10, when the specified keyword is "cute", there are three combinations of context information and item IDs: a combination of item ID "P2011", item type "lunchbox", gender "female", age group "lower grade of elementary school"; a combination of item ID "P2041", item type "lunchbox", gender "female", and age group "twenties"; and a combination of item ID "P3020", item type "rucksack", gender "female", and age group "thirties." The related condition generating unit 58 extracts records numbered with 2, 4, and 9 for the three combinations, respectively.

When the records are extracted, the related condition generating unit 58 selects one or more other keywords that are included in the extracted record and that different from the specified keyword for each combination of context information and an item ID (step S304). The related condition generating unit 58 then determines whether each of the selected other keywords is appropriate as a keyword to which the specified keyword is converted (in the following, also referred to as "replaced") (step S305).

In the example of FIG. 10 and the case where the specified keyword is "cute", in step S304, the related condition generating unit 58 selects "character A" and "lunchbox" as other keywords for the combination of the item ID "P2011", the item type "lunchbox", the gender "female", and the age group "lower grade of elementary school", selects "flower patterns" and "lunchbox" as other keywords for the combination of the item. ID "P2041", the item type "lunchbox", the gender "female", and the age group "twenties", and selects "rabbit patterns" and "rucksack" as other keywords for the combination of the item ID "P3020", the item type "rucksack", the gender "female", and the age group "thirties." In step S305, the related condition generating unit 58 then determines, among the selected keywords, the keyword similar to the item type to be not appropriate as a replaced keyword using a known method for identifying synonyms, and, when other keywords are selected from more number of purchase logs of records in the context information, determines that other keywords having appearance frequency between the first threshold value and the second threshold value are appropriate as replaced keywords. For example, in the example of FIG. 10, "lunchbox" and "rucksack", which are keywords similar to the item type, are determined to be not appropriate as replaced keywords.

Finally, the conversion information setting unit 59 stores the specified keyword, the keyword that is determined to be appropriate as a replaced keyword, and the context information in association with one another into the conversion information storing unit 73 (step S306). The information stored in the step S306 is conversion information.

The processing as shown in FIG. 11 utilizes that different keywords are used when users purchase or select an identical or similar item, and the different keywords are related to one another. This enables the electronic shopping mall server 1 to generate a database for converting a keyword depending on the context, such as a subjective keyword, into a particular keyword depending on the context. Such database is generated mainly based on the user's action, and thus not affected by an arbitrary setting of keywords by a person who prepares contents, such as a seller of an item. In this regard as well, the electronic shopping mall server 1 described in this embodiment can obtain a search result with higher accuracy than before.

In embodiments described thus far, the electronic shopping mall server 1 has functions from the search condition obtaining unit 51 to the conversion information setting unit 59, although some of the functions may be implemented in another computer. For example, functions of the search condition obtaining unit 51 and the search condition converting unit 52 may be implemented by the user terminal 2, and the functions of the related condition generating unit 58 and the conversion information setting unit 59 may be implemented in another server.

The invention claimed is:

1. A search system comprising:
   at least one processor; and
   at least one memory device that stores a plurality of instructions, which when executed by the at least one processor, causes the at least one processor to:
   obtain a second keyword based on a first operation related to a first keyword and performed by one or more users, context information indicating context of the first operation, and a second operation related to the second keyword;
   store the obtained second keyword in association with the first keyword and the context information into a conversion information storage as a converted search condition; and
   obtain a search keyword entered by a user and search context information;
   convert the search keyword to the second keyword as the converted search keyword if the search keyword and the search context information are associated with the second keyword;
   execute a search for obtaining a target that satisfies the converted search keyword, wherein the first operation is an operation performed by one or more users to associate the target with the first keyword,
the second operation is an operation performed by one or more users to associate the target with a keyword that is different from the first keyword,
the first keyword is a word having meaning that varies depending on the context information, and
the context information is at least one of item type, gender, age group, location, date, time, or type of user terminal.

2. The search system according to claim 1,
wherein, in obtaining the second keyword, information is obtained wherein the information indicate the first operation performed by the one or more users to associate the target with the first keyword,
the context information indicating context of the operation is obtained, and
another second keyword is obtained, wherein the another second keyword is associated with the target obtained in the context or a target similar to the obtained target by the second operation.

3. The search system according to claim 2,
wherein, in obtaining the second keyword,
one or more targets are obtained,
wherein the one or more targets are the targets obtained by a search according to the first keyword,
a predetermined instruction from the user is received,
context information of the search is obtained, and
another keyword in another search as the second keyword is obtained,
wherein the another search is a search where the target obtained in the context or the target similar to the obtained target is obtained.

4. The search system according to claim 2,
wherein, in obtaining the second keyword,
one or more targets to which the user enters an evaluation comment including the first keyword is obtained
the context information indicating context to which the evaluation comment is entered is obtained, and another keyword as the second keyword in the search where the target is obtained in the context or the target similar to the obtained target is obtained.

5. A search method comprising:
obtaining a second keyword based on a first operation related to a first keyword and performed by one or more users, context information indicating context of the first operation, and a second operation related to the second keyword;
storing the obtained second keyword in association with the first keyword and the context information into conversion information storing means as a converted search condition; and
obtaining a search keyword entered by a user and search context information;
converting the search keyword to the second keyword as the converted search keyword if the search keyword and the search context information are associated with the second keyword;
executing a search for obtaining a target that satisfies the converted search keyword, wherein
the first operation is an operation performed by one or more users to associate the target with the first keyword, the second operation is an operation performed by one or more users to associate the target with a keyword that is different from the first keyword, the first keyword is a word having meaning that varies depending on the context information, and the context information is at least one of item type, gender, age group, location, date, time, or type of user terminal.

6. The search method according to claim 5, further comprising:

obtaining information indicating the first operation performed by the one or more users to associate the target with the first keyword and the context information indicating context of the operation, and obtaining another second keyword, which is associated with the target obtained in the context or a target similar to the obtained target by the second operation.

7. The search method according to claim 6, further comprising:

obtaining one or more targets, which are the targets obtained by a search according to the first keyword and receive a predetermined instruction from the user, and context of the search, and obtaining another keyword in another search, which is a search where the target obtained in the context or the target similar to the obtained target.

8. The search method according to claim 6, further comprising:

obtaining one or more targets to which the user enters an evaluation comment including the first keyword are obtained and the context information indicating context to which the evaluation comment is entered, and obtaining another keyword as the second keyword in the search where the target is obtained in the context or the target similar to the obtained target.

9. A non-transitory computer-readable information storage medium having stored thereon a program for causing a computer to:

obtain a second keyword based on a first operation related to a first keyword and performed by one or more users, context information indicating context of the first operation, and a second operation related to the second keyword;

store the obtained second keyword in association with the first keyword and the context information into conversion information storing means as a converted search condition; and obtain a search keyword entered by a user and search context information;

convert the search keyword to the second keyword as the converted search keyword if the search keyword and the search context information are associated with the second keyword;

execute a search for obtaining a target that satisfies the converted search keyword, wherein the first operation is an operation performed by one or more users to associate the target with the first keyword, the second operation is an operation performed by one or more users to associate the target with a keyword that is different from the first keyword, the first keyword is a word having meaning that varies depending on the context information, and the context information is at least one of item type, gender, age group, location, date, time, or type of user terminal.

* * * * *